United States Patent
Fiebig et al.

(10) Patent No.: US 8,359,342 B2
(45) Date of Patent: Jan. 22, 2013

(54) METHOD AND SYSTEM FOR GENERATING INDEXES IN AN XML DATABASE MANAGEMENT SYSTEM

(75) Inventors: Thorsten Fiebig, Manheim (DE); Gary Woods, Seeheim (DE); Gunther Rademacher, Münster (DE)

(73) Assignee: Software AG, Darmstadt (DE)

( * ) Notice: Subject to any disclaimer, the term of this patent is extended or adjusted under 35 U.S.C. 154(b) by 677 days.

(21) Appl. No.: 12/292,146

(22) Filed: Nov. 12, 2008

(65) Prior Publication Data

US 2010/0005108 A1    Jan. 7, 2010

(30) Foreign Application Priority Data

Jul. 4, 2008 (EP) .................................. 08012171

(51) Int. Cl.
*G06F 17/30* (2006.01)

(52) U.S. Cl. ........ 707/830; 707/715; 707/740; 707/741; 715/234

(58) Field of Classification Search ................. 707/696, 707/698, 702, 711, 715, 739–741, 830, 999.1, 707/999.002, 999.003, 999.01, 999.004, 707/999.205, E17.123, E17.002, 999.02, 707/999.005, 759, 708, 727, 728, 732–734, 707/738, 749–751, 999.102, E17.067; 715/234, 715/700, 745, 854, 968; 709/224

See application file for complete search history.

(56) References Cited

U.S. PATENT DOCUMENTS

| | | | |
|---|---|---|---|
| 6,584,459 B1 * | 6/2003 | Chang et al. | 707/812 |
| 6,681,223 B1 * | 1/2004 | Sundaresan | 1/1 |
| 7,509,355 B2 * | 3/2009 | Hanes et al. | 1/1 |
| 2005/0114316 A1 | 5/2005 | Fontoura et al. | |
| 2005/0131906 A1 * | 6/2005 | Shin | 707/10 |
| 2006/0248092 A1 * | 11/2006 | Keller et al. | 707/100 |
| 2007/0022105 A1 * | 1/2007 | Roux | 707/4 |
| 2007/0043743 A1 | 2/2007 | Chen et al. | |
| 2007/0271243 A1 * | 11/2007 | Fan et al. | 707/3 |
| 2008/0162735 A1 | 7/2008 | Voigt et al. | |

* cited by examiner

*Primary Examiner* — Greta Robinson
(74) *Attorney, Agent, or Firm* — Nixon & Vanderhye P.C.

(57) ABSTRACT

The invention concerns a method for generating at least one index (10) over XML documents (30) in an XML database (40); the method comprising the steps of:

a. executing at least one indexing function (20) defined in the XQuery language; each indexing function (20) accepting an XML document (30) as input and returning at least one computed result; and b. storing each of the at least one computed results from the at least one indexing function (20) as a key (11) of the corresponding index (10) and a reference to the input XML document (30) as a value (12) of the index (10).

13 Claims, 2 Drawing Sheets

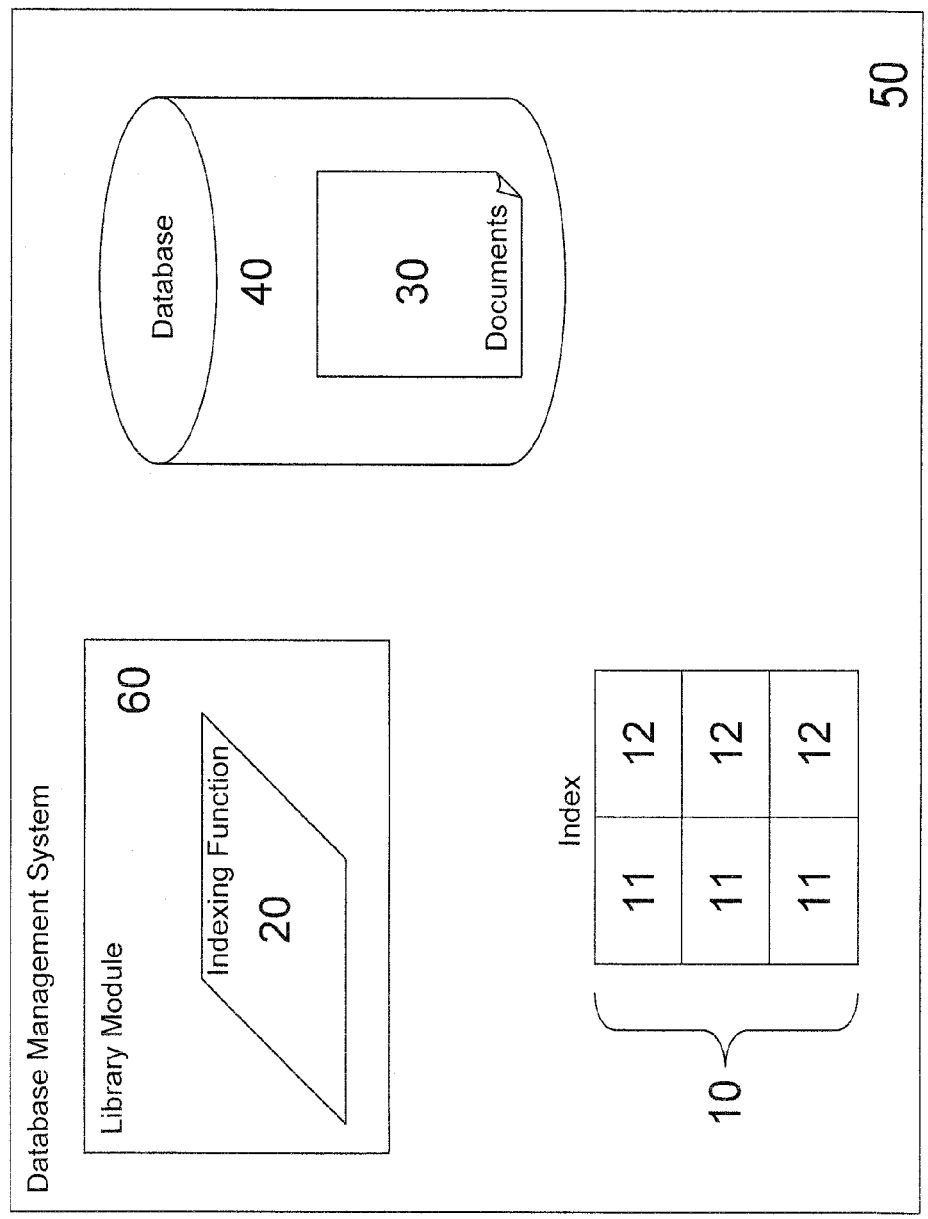

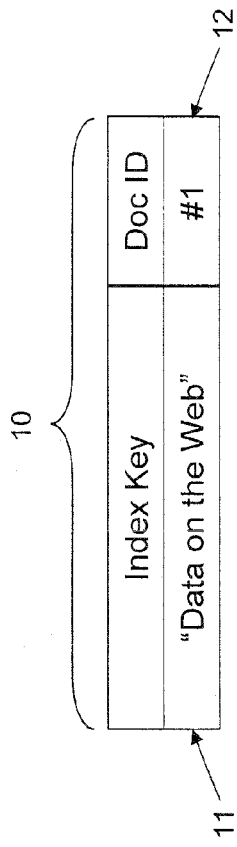
Fig. 3
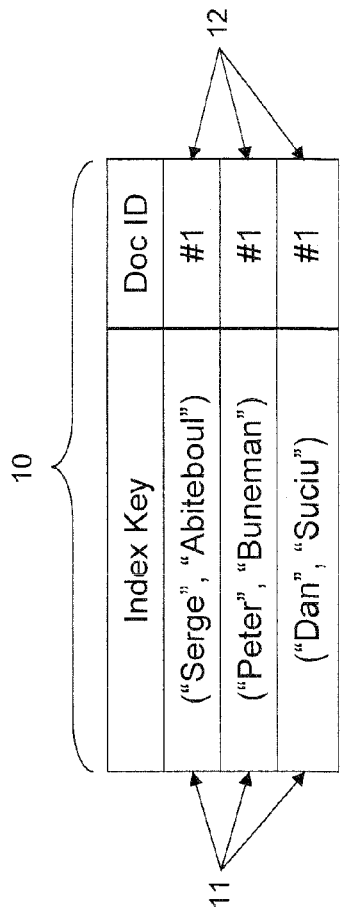
Fig. 4
Fig. 2
```
<book year ="2000">
<title>Data on the Web</title>
<author>
<last> Abiteboul </last>
<first> Serge </first>
</author>
<author>
<last> Buneman </last>
<first> Peter</first>
</author>
<author>
<last> Suciu </last>
<first> Dan </first>
</author>
</book>
```

METHOD AND SYSTEM FOR GENERATING INDEXES IN AN XML DATABASE MANAGEMENT SYSTEM

1. TECHNICAL FIELD

This application claims priority to European Application No. 08012171.8, filed Jul. 4, 2008, the entire contents of which are hereby incorporated by reference.

The present invention relates to a method and system for generating indexes over XML documents in an XML database management system.

2. THE PRIOR ART

Data in the Extensible Markup Language (XML) format is of growing importance in modern applications, e.g. those following the Service Oriented Architecture (SOA) paradigm. This makes XML database management systems (XDBMS) a central component in modern IT infrastructures. One of the key features of an XDMBS is the efficient processing of data retrieval queries. To state such queries in a declarative way, the World Wide Web Consortium (W3C) has proposed the XML query language (XQuery). Due to its functional nature, XQuery allows to easily compose complex queries from simple expressions. Furthermore, XQueries may contain search predicates involving complex computations.

A prerequisite for efficient data retrieval on large databases is the definition of appropriate indexes. For traditional relational database management systems (RDBMS) several approaches have been proposed and implemented. An example for defining indexes on complex computations in SQL queries is the use of function-based indexes in Oracle databases.

However, since the field of XML databases is relatively new compared to relational approaches like SQL, there is no efficient way for indexing huge XML databases that takes full advantage of the expressiveness of the XQuery language.

It is therefore the technical problem underlying the present invention to define an approach based on XQuery that allows for the generation of efficient indexes from complex computations leveraging the expressiveness and computation power of XQuery and therefore enhancing the efficiency of data retrieval and thereby at least partly overcoming the above explained disadvantages of the prior art.

3. SUMMARY OF THE INVENTION

This problem is according to one aspect of the invention solved by a method for generating at least one index over XML documents in an XML database. In the embodiment of claim 1, the method comprises the steps of:
a. executing at least one indexing function defined in the XQuery language; each indexing function accepting an XML document as input and returning at least one computed result; and
b. storing each of the at least one computed results from the at least one indexing function as a key of the corresponding index and a reference to the input XML document as a value of the index.

Accordingly, the embodiment defines computed indexes over the result of complex computations expressed in the XML query language (XQuery). Such an index is computed from an indexing function which takes an input parameter and returns at least one computed result. The input parameter is preferably the root node of the XML document to be indexed. The computed results may be simple type values like string, int or short.

An index is an efficient data structure comprising key/value-pairs. The computed results of the indexing function serve as the keys of the index, whereas a reference to the indexed XML document is set as the corresponding values of the index. This means that a computed index preferably enables the fast retrieval of XML documents. However, the described method may also be used for other indexing strategies like e.g. indexing parts of XML documents, XML elements or XML attributes.

In a preferred embodiment of the invention, the indexing function computes a computed compound index, i.e. it returns a sequence of complete XML substructures instead of simple type values. The XML substructures may then be mapped onto a tuple of type values which are used as keys of the index. Such a computed compound index may for example be used to evaluate complex queries with conjunctive search predicates, as outlined in the detailed description below.

The mapping of the resulting XML substructures onto a tuple of type values may be in one embodiment achieved by further defining at least one pair of path expressions and types and by comparing the resulting XML substructures to the path expressions and typing each XML substructure that conforms to a path expression with the associated type. However, it should be appreciated that this kind of mapping is only one of a variety of alternatives and could be achieved in other ways as well.

An indexing function may further use aggregation functions such as average, count or sum, which allows for even more complex computations. Examples of such indexing functions can be found in the detailed description of the invention.

In another embodiment, an indexing function may return a new constructed element or attribute, i.e. an element or attribute that is not present in the indexed XML document but created by the indexing function.

Indexing functions may be defined in a library module which is then bound to a collection of the XML database. A collection is a named container in an XML database for storing XML documents. An XML database typically, but not necessarily contains multiple collections with XML documents. This allows for the reuse of the definition of indexing functions across different collections or different databases.

It is to be noted that for defining a computed index it is not required that the structure of the XML data is completely defined by the XML schema of the database. Only the collection needs to be specified on which the index is supposed to operate. This allows for the definition of indexes on XML data with unknown or just partially known structure.

Library modules can be used for index definition as well as for querying. An XQuery may import the module that holds the indexing function and use it in a part of its query expression. This function can then be evaluated by scanning the values of the computed index instead of scanning the whole database, resulting in a much more efficient query processing.

According to a further aspect of the present invention, an XML database management system (XDBMS) is provided for generating at least one index over XML documents in an XML database, the XDBMS comprising at least one library module comprising at least one indexing function defined in the XQuery language and each indexing function accepting an XML document as input and returning at least one computed result. The system is adapted for executing the at least one indexing function and for storing each of the at least one computed results from the at least one indexing function as a key of the corresponding index and a reference to the input XML document as a value of the index.

Further advantageous modifications of embodiments of the method and the system of the invention are defined in further dependent claims.

4. SHORT DESCRIPTION OF THE DRAWINGS

In the following detailed description, presently preferred embodiments of the invention are further described with reference to the following figures:

FIG. 1: An overview of an embodiment of a method and system according to the present invention;

FIG. 2: An exemplary input XML document;

FIG. 3: An exemplary computed index;

FIG. 4: An exemplary computed compound index;

5. DETAILED DESCRIPTION

In the following, a presently preferred embodiment of the invention is described with respect to an XDBMS 50 as schematically shown in FIG. 1. As can be seen, the XDBMS 50 comprises at least one library module 60, in which at least one indexing function 20 is defined. It should be appreciated that the embodiment depicted in FIG. 1 is one of a variety of possible embodiments. In particular, the XML database 40 depicted in FIG. 1 which holds XML documents 30 may be part of the XDBMS 50 or located on a different physical system. Other system architectures like for example a distributed database may also be possible.

In the exemplary embodiment, the indexing function 20 is defined in the XQuery language and attached to the schema (not shown in FIG. 1) that defines the structure of XML data stored in an XML database 40. When the indexing function 20 is evaluated with an input XML document 30 from the XML database 40, the resulting values are taken to generate index keys 11 of an index 10. The index keys 11 map the result of the indexing function 20 to the input XML document 30, i.e. to a reference 12 to the XML document 30 in the index 10.

The evaluation of the indexing function 20 is preferably performed when a new XML document 30 is stored in the XML database 40. It should be appreciated that the evaluation could also be processed at other points in time, e.g. in periodic intervals. Furthermore, a reverse process may be performed when XML documents 30 are deleted from the XML database 40, i.e. removing the corresponding index entries.

The following is a simple example of an indexing function 20:

```
declare function getTitle($in as node( )) as xs:string*
{
    for $x in $in//title
    return string($x)
}
```

As can be seen, the function getTitle( ) returns all title values contained in a given XML document 30 that is passed to the function as an input parameter. The function retrieves all title elements and returns their string value. As shown in the example, indexing functions may accept a single input parameter and return simple type values. The purpose of the input parameter is to pass the root node of the XML document 30 to be indexed.

To integrate the above example indexing function 20 into the example XDBMS 50, it is stored in the library module 60. XQuery library modules are defined by the XQuery standard. The following XQuery module defines the example indexing function getTitle( ):

```
module namespace idx="http://www.example.com/indexing"
declare function idx:getTitle($in as node( )) as xs:string*
{
    for $x in $in//title
    return string($x)
}
```

In the example above, the library module 60 is identified by its target namespace that is bound to a namespace prefix idx. Once defined in the library module 60, the indexing function 20 has to be associated with the XML database 40 on which it is supposed to operate. This may be done by using schema documents following the XML Schema W3C standard.

An XML schema defines the general structure of XML data, but does not enclose any definition of database related properties as is. For this purpose, arbitrary application specific annotations may be added to an XML schema. XDBMS 50 such as the Tamino XML server of applicant have their own XML language for defining database related properties via XML schema annotations. The following XML schema fragment shows the Tamino-specific annotations for defining the example computed index:

```
<?xml version = "1.0" encoding = "UTF-8"?>
<xs:schema targetNamespace = "..." xmlns = "..." xmlns:tsd =
"..." xmlns:xs = "...">
  <xs:annotation>
  <xs:appinfo>
    <tsd:schemaInfo name = "bibliography">
      <tsd:collection name = "bibliography"/>
      <tsd:physical>
        <tsd:index>
          <tsd:computed function="getTitle"
          module="http://www.example.com/indexing" />
        </tsd:index>
      </tsd:physical>
...
```

The schema annotation above consists of a schemaInfo element that holds the Tamino-specific database properties. It first defines the collection bibliography. A collection is a named container in an XML database 40 for storing XML documents 30. An XML database 40 typically contains multiple collections with XML documents 30. The physical properties of the example collection contain the computed element holding the definition of the computed index. The element references the target namespace of the XQuery module library 60 and the name of the indexing function 20 via the attributes module and function.

The described way of referencing an indexing function 20 from a schema definition introduces a strong dependency between library modules 60 and schema definitions in an XML database 40. Each change of the referenced indexing function 20 should be reflected by according changes of the computed index entries. The integrity needs to be enforced by the XDBMS 50.

It should be appreciated that the above example of Tamino-specific schema annotations is only one of a variety of possible embodiments and that the method and system defined by the present invention may be adapted to different kinds of database products, in which other ways of binding the indexing functions to the database might be suitable.

FIG. 2 shows an example XML document 30. The index 10 that has been created by evaluating the example indexing function getTitle( ) with this document as input is depicted in FIG. 3.

The resulting index entries may be stored in conventional index structures, e.g. a B* tree, which enables the fast retrieval of XML documents. As the above example shows, for defining a computed index it is not required that the structure of the XML data is completely defined by the XML schema. Just the collection needs to be specified on which the index is supposed to operate. This allows for the definition of indexes on XML data with unknown or just partially known structure.

The library module 60 can be used for index definition as well as for querying. An XQuery that uses the library module 60 holding the indexing function 20 may look like this:

```
import module namespace idx="http://www.example.com/indexing"
for $d in collection("bibliography")
return idx:getTitle($d)
```

The XQuery imports the library module 60 that holds the indexing function 20 and determines the title values for each XML document 30 stored in the collection bibliography by calling the getTitle( ) function on each XML document 30 of the collection. This function can be evaluated by scanning the keys 11 of the computed index 10 from FIG. 3.

In order to exploit a computed index during query processing, the query processor has to identify a function call that can be optimized. Usually index-based optimization is performed for search predicates or sort operations. The following example shows an XQuery holding a search predicate (the where-clause) that can be evaluated via the example computed index 10 from FIG. 3:

```
import module namespace idx="http://www.example.com/indexing";
for $a in collection("bibliography")/book
where idx:getTitle(root($a)) = "Software AG's Tamino XQuery processor"
return $a
```

The XQuery above finds books with the title Software AG's Tamino XQuery processor in the collection bibliography. The computed index 10 for evaluating the XQuery can be identified via the name of the queried collection and the name of the function that is involved in the search predicate. This means by scanning the index and looking for the title, the XML documents 30 can be identified that fulfill the search predicate.

Computed indexes may also be used to evaluate sorting or aggregate queries. Aggregate queries comprise at least one aggregation operation like average, count or sum. The following is an example of an indexing function 20 using a count operation, which determines the number of authors of books:

```
declare function idx:getAuthorCount($in as node( )) as xs:integer
{
    count($in/book/author)
}
```

The computed index 10 that is associated to the getAuthorCount( ) indexing function can be used to optimize the following exemplary sort query:

```
import module namespace idx="http://www.example.com/indexing";
for $a in collection("bibliography")/book
order by idx:getAuthorCount(root($a))
return $a
```

This XQuery sorts the books according to the number of authors in ascending order. Assuming that the index entries are maintained in a B* tree, the order of the documents can be determined by just scanning the leave pages of the B* tree. A prerequisite for optimizing such sort queries is that the indexing function 20 returns only one value per input XML document 30.

More powerful indexing can be performed via computed compound indexes. Their purpose is to not just index XML documents 30 via simple type values but by complete XML substructures. For example, assuming the following function that determines book authors:

```
declare function idx:getAuthor($in as node( )) as node( )*
{
    $in/book/author
}
```

This indexing function 20 returns author elements contained in a book element. In this example, each author element is assumed to contain a first and a last element holding the first and the last name of a book author. A computed compound index definition in a schema that indexes the first and last name then may look like this:

```
<?xml version = "1.0" encoding = "UTF-8"?>
<xs:schema targetNamespace = "..." xmlns = "..."
xmlns:tsd = "..." xmlns:xs = "...">
  <xs:annotation>
    <xs:appinfo>
      <tsd:schemaInfo name = "bibliography">
        <tsd:collection name = "bibliography"/>
        <tsd:physical>
         <tsd:index>
          <tsd:computed function="getAuthor"
           module="http://www.example.com/indexing" />
            <tsd:compound xpath="first" type="xs:string"/>
            <tsd:compound xpath="last" type="xs:string"/>
          </tsd:computed>
         </tsd:index>
        </tsd:physical>
        ...
```

A computed compound index definition as shown above contains an indexing function 20 and an arbitrary number of compound elements. Each compound consists of a path expression and a type. Since the indexing function 20 in the example above returns XML elements, the path expressions of the compounds are applied to the result of the indexing function 20 to yield tuple-valued index keys 11. The type of a compound specifies the simple type that is extracted from the result of the path expression. FIG. 4 shows the index 10 generated by the getAuthor( ) indexing function over the input XML document 30 from FIG. 2.

As FIG. 4 shows, a computed compound index generates tuple-valued index keys 11, which can e.g. be stored in a multi dimensional index structure. The computed compound index 10 can be used to evaluate XQueries with conjunctive search predicates like the following example:

```
import module namespace idx="http://www.example.com/indexing";
for $a in collection("bib")/book
let $b := idx:getAuthor(root($a))
where $b/first="Dan" and $b/last="Suciu"
return $a
```

The XQuery retrieves all books written by Dan Suciu. Identifying a computed index 20 that can be used to evaluate an XQuery of this kind is more complex compared to a simple computed index. In addition to the collection and the indexing function 20, also the compound path expression needs to be matched. For this the equivalence of the path expression in the XQuery and the compound path expression needs to be checked.

Since the full XQuery expressiveness can be used for an indexing function 20, much more complex definitions are possible. An indexing function 20 can e.g. return a constructed element or attribute. The following indexing function 20 returns the publication year of a book and the number of involved authors:

```
declare function idx:getYearAuthorCount($in as node( )) as node( )*
{
    for $b in $in/book
    return <result year="{$b@year}" count="{count($b/author)}"/>
}
```

The corresponding schema definition looks like this:

```
<?xml version = "1.0" encoding = "UTF-8"?>
<xs:schema targetNamespace = "..." xmlns = "..."
xmlns:tsd = "..." xmlns:xs = "...">
  <xs:annotation>
    <xs:appinfo>
      <tsd:schemaInfo name = "bibliography">
        <tsd:collection name = "bibliography"/>
        <tsd:physical>
          <tsd:index>
            <tsd:computed function="getYearAuthorCount"
            module="indexing" />
              <tsd:compound xpath="@year" type="xs:integer"/>
              <tsd:compound xpath="@count" type="xs:integer"/>
            </tsd:computed>
          </tsd:index>
        </tsd:physical>
        ...
```

Based on this computed compound index the following XQuery can be optimized:

```
import module namespace xyz="indexing";
for $a in collection("bib")/book
let $b := idx:getYearAuthorCount(root($a))
where $b[@year = 2007 and @count < 3]
return $a
```

The XQuery looks for books that have been published in 2007 with less than 3 authors involved.

As shown above, when an XQuery expression is processed, the query processor may check if the query expression calls one of the indexing functions 20. In this case it checks if the computed index 10 can be used to optimize the given query, and then scans the index 10 instead of the complete XML documents 30 in the XML database 40.

The invention claimed is:

1. A computer-implemented method for generating at least one index over XML documents in an XML database configured to operate in a computing system that includes at least one processor, the method comprising:
    executing, via the at least one processor, at least one indexing function defined in the XQuery language, each said indexing function being configured to accept an XML document as input and to return at least one computed result;
    storing each said computed result from the at least one indexing function as a key of the corresponding index; and
    storing a reference to the input XML document as a value of the index,
    wherein the at least one indexing function returns at least one XML substructure, and further comprising mapping each of the at least one XML substructures onto a tuple of type values and wherein each of the tuples is stored as a key of the index.

2. The method of claim 1, wherein the mapping is defined by at least one pair of path expressions and types, the elements of the tuples being populated with the parts of the XML substructures which correspond to the path expressions and being typed with the corresponding types.

3. The method of claim 1, wherein the at least one indexing function calls at least one aggregation operation.

4. The method of claim 1, wherein the at least one indexing function returns at least one constructed element or attribute not present in the input XML document.

5. The method of claim 1, wherein the at least one indexing function is defined in a library module and the library module is bound to at least one collection of XML documents in the XML database.

6. The method of claim 1, wherein the structure of the XML documents in the XML database is unknown or partially defined in a schema of the XML database.

7. The method of claim 1, further comprising optimizing an XQuery that comprises at least one call of an indexing function by scanning the corresponding index of the indexing function when processing the XQuery.

8. A non-transitory computer readable storage medium tangibly storing a computer program comprising instructions that, when executed by at least one processor of a computing system, are configured to perform the method according to claim 1.

9. An XML database management system (XDBMS) for generating at least one index over XML documents in an XML database, the system comprising:
    at least one processor configured to execute at least one indexing function that takes as input an XML document and returns at least one computed result; and
    a non-transitory computer readable storage medium configured to store:
        at least one library module comprising the at least one indexing function defined in the XQuery language, each said indexing function being configured to accept an XML document as input and to return at least one computed result;
        the at least one computed result from the at least one indexing function as a key of the corresponding index,
    wherein the at least one indexing function is configured to return at least one XML substructure and wherein the at least one processor is further configured to map each said XML substructure onto a tuple of type values and to store each of the tuples as a key of the index.

10. The system of claim 9, further comprising at least one pair of path expressions and types, and wherein the at least one processor is further configured to populate the elements of the tuples with the parts of the XML substructures that correspond to the path expressions and to type the elements of the tuples with the corresponding types.

11. The system of claim 9, wherein the at least one processor is further configured to bind the library module to at least one collection of XML documents in the XML database.

12. The system of claim 9, wherein the at least one processor is further configured to optimize an XQuery that comprises at least one call of an indexing function by scanning the corresponding index of the indexing function when processing the XQuery.

13. An XML database management system (XDBMS) for generating an index from a plurality of XML documents, the system comprising:
  a processing system that includes at least one processor, the processing system configured to:
    load an XML document from among the plurality of XML documents;
    execute at least one XQuery indexing function using the received XML document as input;
    obtain a result from execution of the XQuery indexing function with the received XML document;
    create, on a non-transitory computer readable storage medium, an index entry; and
    populate the index entry on the non-transitory computer readable storage medium with the XQuery result as a key of the index entry and a reference to the XML document from the plurality of XML documents as a value of the index entry,
  wherein a result from the execution of the at least one XQuery indexing function is at least one XML substructure, and
  wherein the at least one processor is further configured to map each one of the at least one XML substructure onto a tuple of type values and to store each of the tuples as the key of a respective index entry.

* * * * *